United States Patent
Sugiyama

(10) Patent No.: US 7,133,154 B2
(45) Date of Patent: Nov. 7, 2006

(54) IMAGE FORMING APPARATUS AND MASKING COEFFICIENT CALCULATION METHOD

(75) Inventor: Naoki Sugiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 964 days.

(21) Appl. No.: 10/103,758

(22) Filed: Mar. 25, 2002

(65) Prior Publication Data
US 2003/0002096 A1   Jan. 2, 2003

(30) Foreign Application Priority Data
Mar. 28, 2001   (JP) ............................. 2001-094234

(51) Int. Cl.
   *G06K 15/00* (2006.01)
(52) U.S. Cl. ....................... 358/1.9; 382/162
(58) Field of Classification Search ................ 358/1.9, 358/2.1, 501, 502, 503; 382/162
See application file for complete search history.

(56) References Cited

U.S. PATENT DOCUMENTS

| | | | | |
|---|---|---|---|---|
| 4,060,829 A | * | 11/1977 | Sakamoto | ................... 358/523 |
| 4,393,398 A | * | 7/1983 | Horiguchi et al. | .......... 358/527 |
| 4,682,216 A | * | 7/1987 | Sasaki et al. | ................ 358/529 |
| 4,887,150 A | * | 12/1989 | Chiba et al. | ................. 358/523 |
| 5,644,403 A | * | 7/1997 | Watanabe | .................... 358/296 |
| 5,999,645 A | * | 12/1999 | Ito | .............................. 382/164 |
| 6,055,071 A | | 4/2000 | Kuwata et al. | |
| 6,816,613 B1 | * | 11/2004 | Tohyama et al. | ........... 382/167 |
| 2002/0140983 A1 | * | 10/2002 | Shimizu | .................... 358/3.01 |
| 2003/0002096 A1 | * | 1/2003 | Sugiyama | .................... 358/518 |
| 2003/0048958 A1 | * | 3/2003 | Ishiguro | ..................... 382/261 |
| 2003/0142865 A1 | * | 7/2003 | Hirota et al. | ............... 382/167 |

FOREIGN PATENT DOCUMENTS

| | | | |
|---|---|---|---|
| DE | 197 19 742 A1 | | 1/1998 |
| JP | 04281668 | * | 10/1992 |
| JP | 10-191061 | | 7/1998 |
| JP | 2005039584 | * | 2/2005 |

* cited by examiner

*Primary Examiner*—Jerome Grant
(74) *Attorney, Agent, or Firm*—Dickstein Shapiro LLP

(57) ABSTRACT

An image forming apparatus for calculating a masking coefficient is provides, in which the masking coefficient is calculated by using RGB input image signals obtained by reading a document of which spectral characteristics are known by an image reading part and CMYK output image signals optimal for reproducing a color of the document. The masking coefficient can be also calculated by using difference values between CMYK output image signals obtained from actually read RGB signals and optimal CMYK output image signals.

20 Claims, 10 Drawing Sheets

IMAGE FORMING APPARATUS AND MASKING COEFFICIENT CALCULATION METHOD

BACKGROUND OF THE INVENTION

1. Field of the Invention

The present invention relates to an image forming apparatus such as a copying machine, a printer and a FAX and the like. More particularly, the present invention relates to an image forming apparatus having a color conversion function for handling a color image.

2. Description of the Related Art

Conventionally, for performing color correction in a digital image forming apparatus, there is a technology in which a pattern image formed on an image carrier is transferred to a transfer material and fixed, and the transferred image is read by a scanner, and, then, a tone correction table is selected/generated on the basis of the read image data, so that tone correction or density correction of a printer part is performed.

Japanese laid-open patent application No. 10-191061 discloses a technology in which the tone correction table is corrected in consideration of variation of spectral characteristics of the scanner so that density values of CMYK and gray balance are corrected.

In a scanner used in an image forming apparatus like a color copying machine, due to change with time in spectral characteristics of an RGB filter in a CCD (Charge Coupled Device) constituting the scanner or due to variations of each machine, even if the same color patch pattern is read, a value read by each scanner may vary from unit to unit.

FIG. 1 is a figure for explaining non-uniformity (variation) of spectral transmission characteristics of a B (Blue) filter in a CCD. In FIG. 1, a) indicates a spectral transmission factor of a blue (B) filter 1 in a CCD, b) indicates a spectral transmission factor of a blue (B) filter 2 in the CCD, c) indicates a spectral reflection factor of yellow (Y) patch, and d) indicates a spectral reflection factor of black (K) patch. The horizontal axis indicates a wavelength, while the vertical axis indicates a spectral transmission factor or a spectral reflection factor of the CCD.

In this figure, it is assumed that the spectral transmission factors a) and b) have been shifted by a rate indicated at h) respectively, but the same consideration is applicable also to a case where the assumption as described above is not made.

Namely, comparing the light transmitted through the blue filter 1 in a) to the light transmitted through the blue filter 2 in b) under the spectral reflection factor d) of black patch, a quantity of light having transmitted through the blue filter 1 is larger by a quantity of light having transmitted through a region e), but is smaller by a quantity of light having transmitted through regions f) and g).

As shown in FIG. 1, since the spectral characteristics of the blue filter 1 in a) and the blue filter 2 in b) have been shifted by a rate in h) respectively, in a case of the light having transmitted through the blue filter 1 in a), the quantity of light having transmitted through the region e) is equal to the quantity of light blocked by the regions f) and g), and for this reason a difference for a blue signal between a) and b) is small as far as the black patch is concerned.

To strictly examine the different above, it is necessary to take into considerations the spectral characteristics of the light source and dependency of sensitivity of a CCD on wavelength, but when calibrating shading of a scanner, by using an achromatic-colored reflection plate with low dependency of a spectral reflection factor for instance in gray on wavelength in a visible light area, the difference between the filter 1 and the filter 2 is calibrated.

However, in a case of yellow (Y) patch, the difference between filters in a) and b) appears as a difference of light having transmitted through or having been blocked by the region g), and the difference is clearly larger than that in a case of black patch. Also the difference can not be calibrated even by a shading calibration using an achromatic-colored reflection plate.

The variations in spectral transmission factors among filters in a CCD can be calibrated in a case of achromatic colors like white or gray by means of shading calibration so that the RGB data become uniform, but in a case of a document with a spectral characteristic dependent on wavelength, the calibration can not be executed appropriately, and sometimes values for R, G, and B may vary unit by unit.

Due to the effect of the variation of the spectral characteristics, in a case where some machines reads the same patch having spectral reflection characteristics similar to the spectral transmission characteristics of the CCD, even if the same RGB output is set when performing shading by using an achromatic color, the outputs are different machine by machine.

The difference becomes a cause of disabling faithful color reproduction in a color calibration process for obtaining record values of cyan, magenta, yellow and black optimal for reproducing the color from RGB values of a document read by the scanner.

It is effective for correcting gray balance of achromatic color to correct the tone correction table as is disclosed in the Japanese laid-open patent application No. 10-191061 in the conventional technology for calibrating variation of the spectral characteristics of the scanner. However, there is a problem in that this technology is not applicable for reproducing chromatic color faithfully.

That is, in the invention disclosed in the Japanese laid-open patent application No. 10-191061, patch data is read by the scanner, and characteristic values of a printer table which is the tone correction table are adjusted on the basis of experiment and the like such that the density of the output of the printer after performing ACC becomes constant even when the machine is changed, so that good tone can be obtained. Therefore, since any calibration of variation of the spectral characteristics of the CCD in the scanner is not performed in the image processing part in the Japanese laid-open patent application No. 10-191061, this variation is not corrected in the input stage of the printer part, but, corrected by the tone correction table in the printer. In addition, since the correction is tone correction, it is effective for gray balance of achromatic color. However, there is a problem in that it is not enough for performing faithful color reproduction for chromatic color.

SUMMARY OF THE INVENTION

An object of the present invention is to provide an image forming apparatus which can calibrate variation of spectral characteristics of the scanner CCD, and obtain a CMYK output image signal which can reproduce a color faithfully without variation for documents of chromatic color.

The object can be achieved by an image forming apparatus including:

an image reading part, including a CCD, for optically reading a color document by scanning the color document;

an image processing part for converting, by using a masking coefficient, RGB input image signals obtained by reading the color document by the image reading part into CMYK output image signals used for recording by developing parts;

a part for calculating the masking coefficient by using RGB input image signals obtained by reading a document of which spectral characteristics are known by the image reading part and CMYK output image signals optimal for reproducing a color of the document.

According to the present invention, color calibration is performed not by correcting the tone correction table in the printer part, instead of that, the masking coefficient is corrected (calculated) on the basis of points on the planes extending radially from an achromatic color axis by which planes a color space is divided irrespective of achromatic color or chromatic color. Thus, variation of spectral characteristics of the scanner CCD can be calibrated irrespective of for achromatic color or chromatic color, so that faithful color reproduction can be performed.

That is, according to the present invention, by using RGB input image signals obtained by actually reading a document (color patch) by a scanner having variation and CMYK output image signals of developing parts optimal for reproducing color of the document of which spectral characteristics are known, a masking coefficient is calculated such that the RGB input image signals are converted to the optimal CMYK output image signals by the masking coefficient. Thus, faithful color reproduction can be performed irrespective of achromatic color or chromatic color.

The image forming apparatus may further includes:

a hue determining part for determining a hue to which the RGB input image signals obtained by reading the document belong among hues corresponding to RGB color spaces divided by planes including an achromatic color axis; and a memory part for storing CMYK output image signal values optimal for reproducing a color of the document of which spectral characteristics are known;

wherein the image reading part reads the document of which spectral characteristics are known;

the hue determining part determines a hue to which the color of the document belongs;

optimal CMYK output image signals is read from the memory part according to the hue; and the masking coefficient is calculated from the RGB input image signals obtained by reading the document and the CMYK output image signals.

The above object can be also achieved by an image forming apparatus comprising:

an image reading part, including a CCD, for optically reading a color document by scanning the color document;

an image processing part for converting, by using a masking coefficient, RGB input image signals obtained by reading the color document by the image reading part into CMYK output image signals used for recording by developing parts;

a part for calculating difference values between first CMYK output image signals and second CMYK output image signals, and calculating the masking coefficient by using the difference values, wherein the first CMYK output image signals are obtained by converting, by using a predetermined masking coefficient, first RGB input image signals obtained by reading a document of which spectral characteristics are known by using the image reading part, and the second CMYK output image signals are obtained by converting, by using the predetermined masking coefficient, second RGB input image signals obtained if the document of which spectral characteristics are known is read by an image reading device which has standard spectral characteristics.

According to this invention, color calibration is performed not by correcting the tone correction table in the printer part, instead of that, the masking coefficient is corrected (calculated) on the basis of points on the planes extending radially from an achromatic color axis by which planes a color space is divided irrespective of achromatic color or chromatic color. Thus, variation of spectral characteristics of the scanner CCD can be calibrated irrespective of for achromatic color or chromatic color, so that faithful color reproduction can be performed.

That is, according to the present invention, the difference values between CMYK output image signals obtained, by using a predetermined masking coefficient, from RGB input image signals obtained by actually reading a document of which the spectral characteristics are known by a scanner CCD and CMYK output image signals obtained, by using the predetermined masking coefficient, from RGB input image signals obtained by if the document of which the spectral characteristics are known is read by a scanner CCD having standard spectral characteristics. Then, the masking coefficient used for color conversion is calculated by using the difference values. By using the difference values, the masking coefficient can be obtained such that the error (due to variation of spectral characteristics of the scanner CCD) which is represented by the difference values is calibrated. Thus, CMYK values can be obtained from the RGB input image signals actually read by the scanner CCD. Therefore, faithful color reproduction can be performed irrespective of achromatic color or chromatic color.

In the image forming apparatus, the predetermined masking coefficient may be calculated by using first two points of spectral data on an achromatic color axis, second two points of spectral data on two boundary planes which are boundary planes forming a color space corresponding to the spectral characteristics of the document in which the second two points are not on the achromatic color axis, and four points of CMYK output image signal data optimal for reproducing colors of four points of the first and second two points; and the predetermined masking coefficient is corrected by correcting the four points of CMYK output image signals by using the difference values.

In addition, the predetermined masking coefficient may be calculated by using first two points of spectral data on an achromatic color axis, second two points of spectral data on two boundary planes which are boundary planes forming a color space corresponding to the spectral characteristics of the document in which the second two points are not on the achromatic color axis, and four points of CMYK output image signal data optimal for reproducing colors of four points of the first and second two points; and the predetermined masking coefficient is corrected by correcting CMYK output image signals of the second two points on the two boundary planes by using the difference values in which CMYK output image signals of the first two points on the achromatic color axis are not corrected.

According to this invention, the difference values are not added to printer vectors of the white point and the black point when calculating the masking coefficient, and, the difference values are added to printer vectors of other two point colors. Accordingly, discontinuity in each boundary plane can be prevented.

The image forming apparatus may include a part for storing RGB input image signals obtained if the document of which spectral characteristics are known is read by an image reading device which has standard spectral characteristics, or CMYK output image signals converted from the RGB input image signals beforehand.

According to the invention, since data necessary for calculating the masking coefficient is stored, the necessary values can be obtained easily when the apparatus is manufactured or when a serviceman performs adjustment.

In addition, the image forming apparatus may further include a part for storing the difference values. Thus, the masking coefficient can be easily obtained. Further, the difference values can be used for other apparatus and the like.

In the image forming apparatus, color patches having the same spectral characteristic as those of divided points on the planes used for dividing the color space can be used for the document of which spectral characteristics are known, and difference values are obtained for each divided point.

By using a document having a color close to the boundary point by which the hue is divided, the color of the boundary point can be reproduced faithfully.

The present invention can be also configures as a method for calculating the masking coefficient, and a computer readable medium storing a program for calculating the masking coefficient.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

First Embodiment

First, the first embodiment of the present invention will be described. The first embodiment is a case when a color calibration technique of the present invention is applied to an electronic photocopying machine (hereinafter, simply called as a copying machine) which is an image forming apparatus.

Although this invention mainly relates to correction or calculation of a masking coefficient for color calibration process performed in an after-mentioned color calibration circuit, a configuration and the operation of the copying machine will be described first with reference to FIGS. 2–4, and the color calibration process will be described in detail after that.

Figure 2:
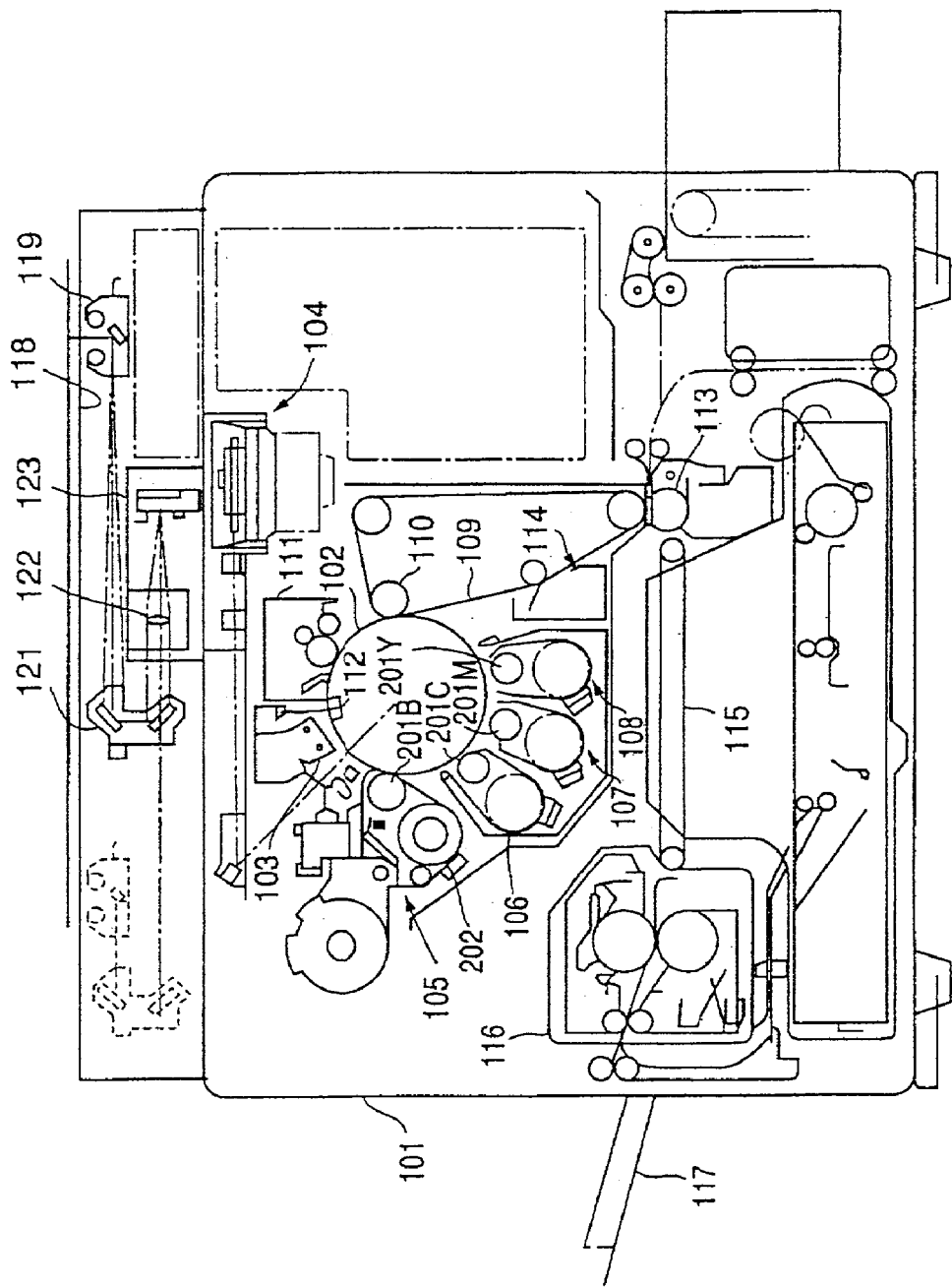
FIG. 2 is a schematic view showing mechanical configuration of the main body of a copying machine 101.

FIG. 2 is a schematic view showing mechanical configuration of the main body of a copying machine 101. Outline of the mechanism of the main body of the copying machine 101 of the present invention will be described with reference to FIG. 2.

In FIG. 2, an organic photosensitive (OPC) drum 102 having a diameter of 120 mm as an image carrier is provided in substantially the center of the main body of the copying machine 101. In addition, successively arranged in the periphery of the organic photosensitive (OPC) are an electrifying charger 103 for electrifying the surface of this photosensitive drum 102, a laser optical system 104 for irradiating the surface of the uniformly electrified photosensitive drum 102 with a semiconductor laser beam to form an electrostatic latent image, a black-developing device 105 and three types of developing device s106, 107, 108 for yellow Y, magenta M, and cyan C for supplying toner for each color to the electrostatic latent image to be developed and obtaining each toner image in each color, an intermediate transfer belt 109 for successively transferring the toner images in each of the colors formed on the photosensitive drum 102, a bias roller 110 for applying a transfer voltage to this intermediate transfer belt 109, a cleaning device 111 for removing toner residues on the surface of the photosensitive drum 102 after the toner image is transferred onto transfer material, and a charge-removing section 112 for removing charge residues on the surface of the photosensitive drum 102 after the toner image is transferred thereonto.

Provided therein are also a transfer bias roller 113 for applying a voltage for transferring the toner image transferred along the intermediate transfer belt 109 onto transfer material and a belt cleaning device 114 for cleaning the image of toner residues on the intermediate transfer belt 109 after the toner image is transferred onto the transfer material.

A fixing device 116 for fixing the toner image by heating or pressuring is provided in the exit side of an edge section of a transfer belt 115 for transferring transfer material peeled from the intermediate transfer belt 109, and a paper feeder tray 117 is also attached to the exit section of this fixing device 116.

A contact glass 118 as a document base arranged on the top section of the main body of a copying machine 101 and an exposing lamp 119 for irradiating a document on this contact glass 118 with scanning light are provided in the upper side of the laser optical system 104, and a reflected light from the document is led to an image-formation lens 122 by a reflecting mirror 121 to be introduced into an image sensor array 123 of a CCD (Charge Coupled Device) as a photoelectric transfer element. Image signals converted to electric signals in the image sensor array 123 of a CCD oscillate a semiconductor laser in the laser optical system 104 through the image processing apparatus not shown herein.

Figure 3:
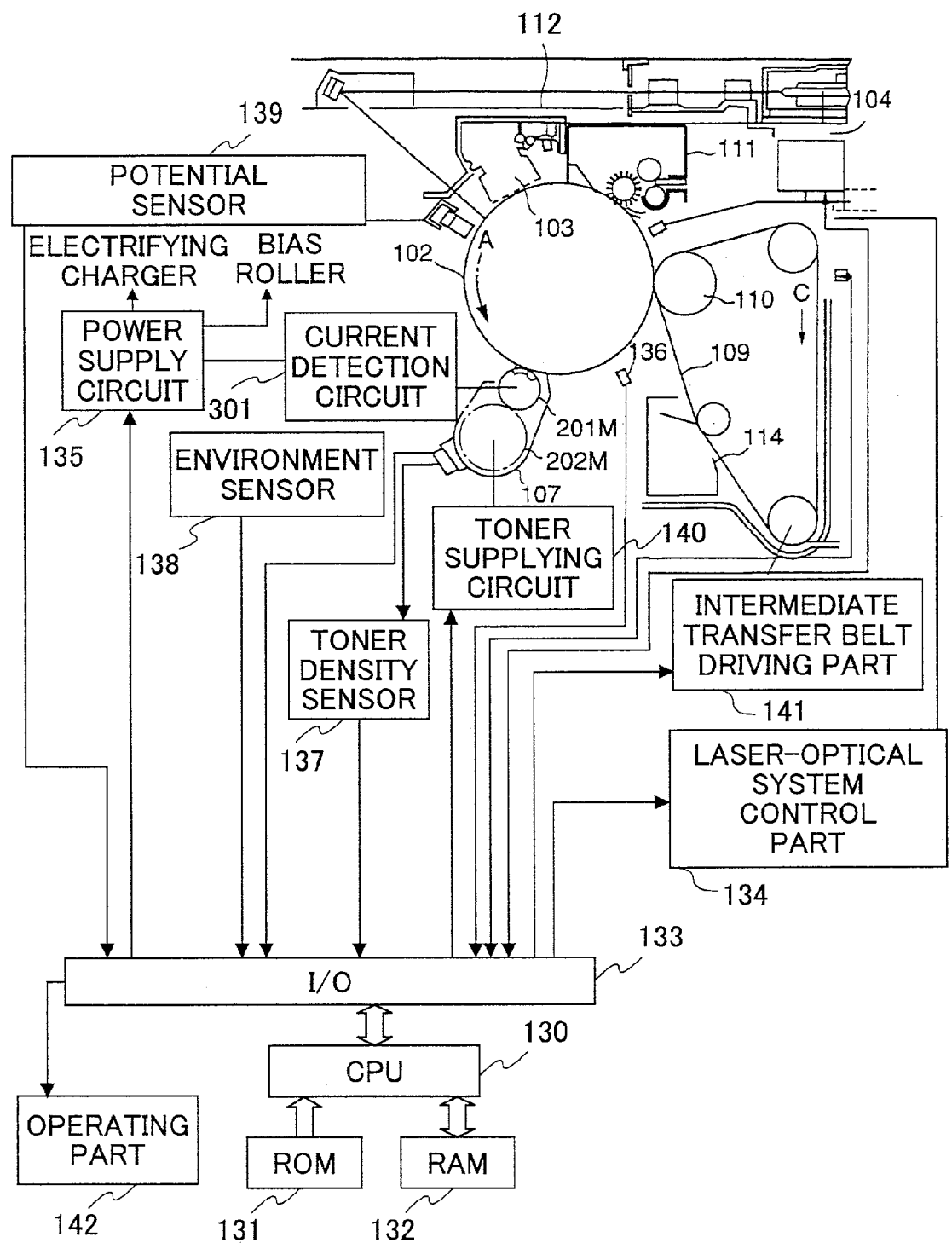
FIG. 3 is a view for explanation of the control system in the main body of the copying machine.

Next, description is made for a control system of the copying machine with reference to FIG. 3. FIG. 3 is a view for explanation of the control system in the main body of the copying machine shown in FIG. 2.

As shown in FIG. 3, the control system has a main control part (CPU) 130, and a ROM 131 and a RAM 132 for this main control part 130 are additionally provided therein. Connected to the main control part 130 are also a laser-optical system control part 134, a power supply circuit 135, an optical sensor 136, a toner density sensor 137, an environment sensor 138, a photosensitive body surface potential sensor 139, a toner supplying circuit 140, an intermediate transfer belt driving part 141, and an operating part 142 respectively through an interface I/O 133.

The laser system control part 134 adjusts laser output from the laser optical system 104, and the power supply circuit 135 gives a specified discharging voltage for electrification to the electrifying charger 113, gives a development bias at a specified voltage to the developing devices 105, 106, 107, 108, and also gives a specified transfer voltage to the bias roller 110 as well as to the transfer bias roller 113.

The optical sensor 136 includes light-emitter such as light-emitting diodes or the like and light-receptors such as photosensors or the like each provided adjacent to an area of the image after being transferred from the photosensitive drum 102, and a quantity of deposited toner in a toner image for a detection-pattern latent image formed on the photosensitive drum 102 and a quantity of deposited toner in the background color section are detected for each color respectively, and so-called potential residues on the photosensitive body after electrification thereon is removed is also detected.

The detection output signal from this photoelectric sensor 136 is applied to the photoelectric sensor control part not shown herein. The photoelectric sensor control part computes a ratio between the quantity of deposited toner in the detection-pattern toner image and the quantity of deposited toner in the background color part, compares the ratio value to the reference value to detect fluctuation in an image density, and corrects the control values for the toner density sensor 137.

In addition, the photoelectric sensor control part has a function for computing an exposure lamp voltage corresponding to it and a function for detecting residual voltage of a photosensitizer and comparing the residual voltage with a reference value, and computing a development bias voltage value corresponding to it. The exposure lamp voltage value and the development bias voltage value detected in this photoelectric sensor control part are applied to an exposure control circuit which controls driving power source voltage of the exposing lamp 119 and a development bias control circuit which applies a voltage to developing devices 105–108 by using development bias.

Further, the toner density sensor 137 detects a toner density according to changes of magnetic permeability in a developer existing in each of the developing devices 105 to 108. The toner density sensor 137 has a function of applying a toner supply signal with amplitude, in a case where the detected toner density value is compared to the reference value and the toner density is found under the specified value which indicates a short of toner therein, corresponding to the shortage thereof to the toner supplying circuit 140.

The potential sensor 139 detects a surface potential of the photosensitive body 102 as an image carrier, and the intermediate transfer belt driving part 141 controls driving of the intermediate transfer belt 109.

Non-magnetic cylindrical development sleeves 201B, 201Y, 201M, 201C which are developer containers are provided in the inside of the developing devices 105–108 with a predetermined gap to the photosensitive drum 102 (only 201M is shown in FIG. 3), wherein the gap between the sleeve and the photosensitive drum 102 is 0.60 mm. In each of the development sleeves 201B, 201Y, 201M, 201C, a development magnet formed such that a plurality of different magnetic poles are alternately arranged and a magnetic shield plate formed of a magnetic substance are provided.

When developing, each of the development sleeves 201B, 201Y, 201M, 201C rotates in the direction of the arrow by a yellow development sleeve driving motor, a magenta development sleeve driving motor, a cyan development sleeve driving motor and the like. A case where the development sleeve rotates in this direction is called "forward rotation".

A developer including a black toner and carrier is contained in the black-developing device 105 and is agitated in association with rotation of a developer agitating member 202, so that the developer sucked up onto a sleeve 201 by a developer restricting member is adjusted on the developing sleeve 201B. This supplied developer rotates in the direction of rotation of the developing sleeve 201B as a magnetic brush while it is magnetically carried on the developing sleeve 201B.

Figure 4:
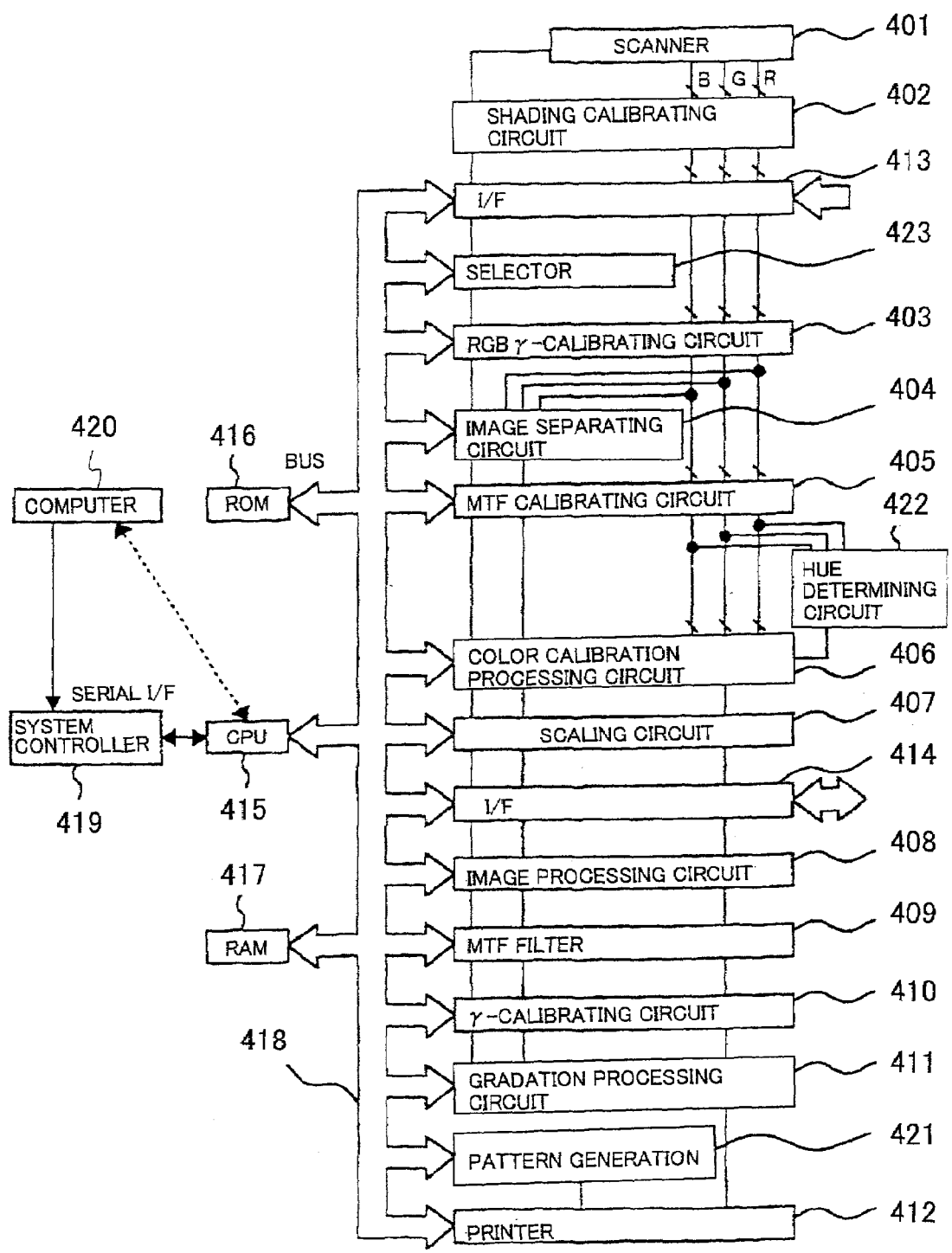
FIG. 4 is a view for explanation of electric configuration of an image processing part.

Next description is made for electric configuration of an image processing part with the reference to a block diagram shown in FIG. 4, in which the color calibration process of the present invention is performed in the image processing part. The image processing part corresponds to the above-mentioned image processing apparatus and installed in the main body of the copying machine, however, the image processing part is not shown in FIG. 1 and FIG. 2.

Figure 1:
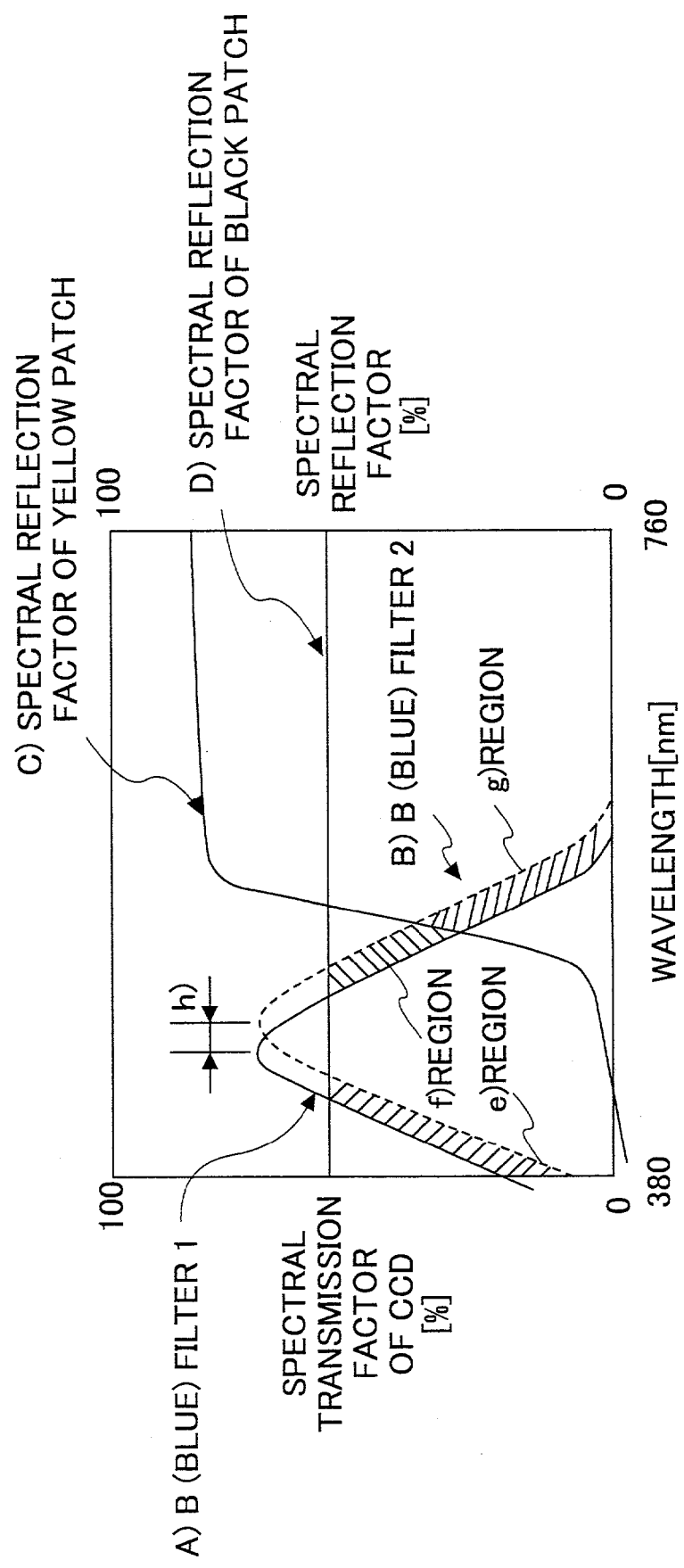
FIG. 1 is a figure for explaining non-uniformity of spectral transmission characteristic of a B (Blue) filter in a CCD.

In FIG. 1, designated at the reference numeral 401 is a color scanner, at 402 a shading calibrating circuit, at 403 an RGBγ-calibrating circuit, at 404 an image separating circuit, at 405 an MTF calibrating circuit, at 406 a color calibration processing circuit, at 407 a scaling circuit, at 408 an image processing (creating) circuit, at 409 an MTF filter, at 410 a γ-calibrating circuit, at 411 a gradation processing circuit, and at 412 a printer.

The scanner corresponds to the image sensor array 123 in the CCD in FIG. 2, and the printer part 412 corresponds to a part relating to image forming after the laser optical system 104.

A document to be copied is resolved into colors of R, G, B and read by the color scanner 401. Non-uniformity due to characteristics of an image pickup device or non-uniformity in irradiation of a light source or the like are calibrated in the shading calibrating circuit 402. Read signals from the color scanner 401 are converted from data for reflection factors to data for brightness in the RGBγ-calibrating circuit 403. Determination is made between a character part and a photographic part as well as between chromatic color and achromatic color in the image separating circuit 404. Degradation of an MTF characteristics in an input system, especially in a high frequency area is calibrated in the MTF calibrating circuit 405.

The color calibration processing circuit 406 which relates to color calibration processing of the present invention includes a color calibration processing part 4061 for correcting a difference between color-resolution characteristics in the input system and spectral characteristics of color materials in an output system and computing a rate of color materials for CMYK required for faithful color reproduction and a UCR processing 4062. Details will be described later.

In the scaling circuit 407, vertical and horizontal scaling is executed, and a repeat processing or the like is executed in the image processing (creating) circuit 408.

Executed in the MTF filter 409 is processing for changing frequency characteristics of image signals such as edge enhancement or smoothing or the like according to a user's taste to an image such as a sharp image or a soft image or the like.

Image signals are calibrated in the γ-calibrating circuit 410 according to characteristics of a printer 412. Processing such as eliminating a background color or the like can concurrently be executed also in the γ-calibrating circuit 410. Dither processing or pattern processing is executed in the gradation processing circuit 411.

Provided therein are interfaces I/F 413, 414 for processing image data read by the scanner 401 in an external image processing unit or the like or outputting the image data from the external image processing unit to the printer 412.

A CPU 415 for controlling the image processing circuit described above, a ROM 416, and a RAM 417 are connected to each other through a BUS 418. The CPU 415 is connected to a system controller 419 through a serial I/F, and commands from the operating section or the like not shown herein are sent thereto. The CPU 415, ROM 416, RAM 417 and the operation part may be the same as the CPU 130, ROM 131, RAM 132 and the operation part 142 in the control system shown in FIG. 3, or may be not the same as those.

The color calibration process in this embodiment is performed in the above-mentioned color calibration processing circuit 406. In the following, the process method is described by using FIGS. 5A and 5B showing a color space.

Figure 5A:
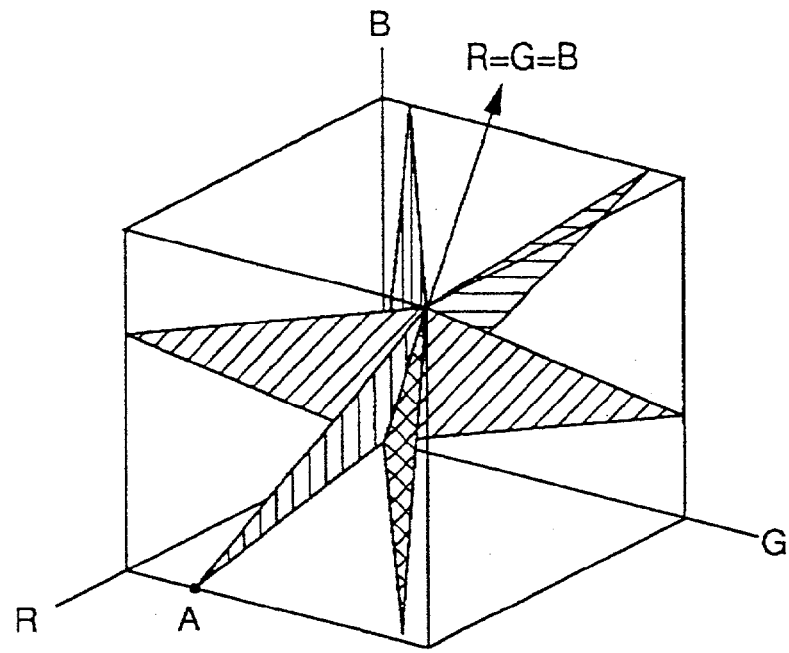
FIGS. 5A and 5B are views of color spaces for explanation of calibration processing.
Figure 5B:
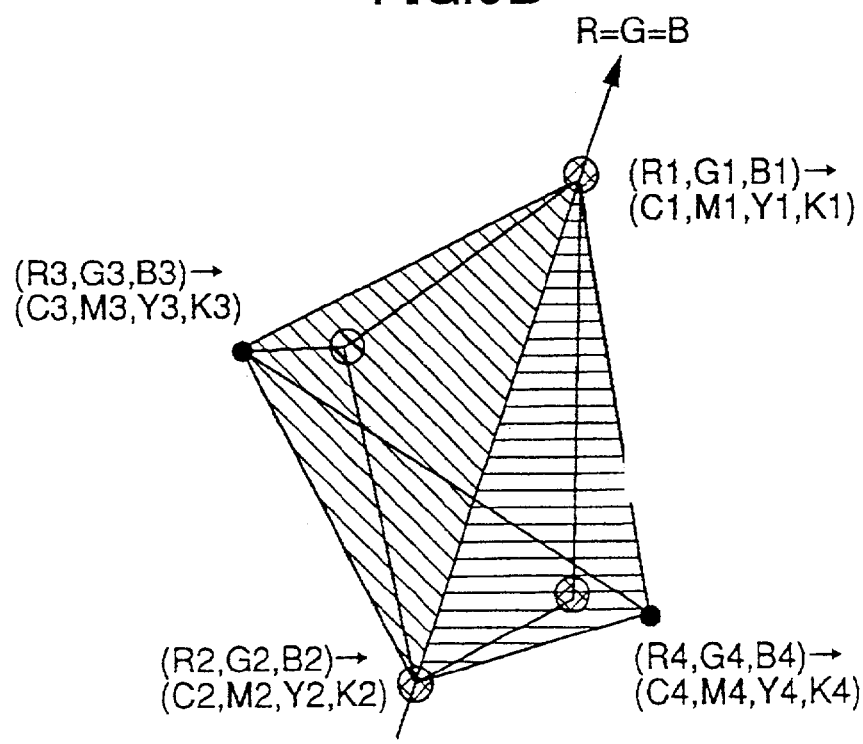

As shown in FIG. 5A, in the color calibration processing in this embodiment, the color space (R,G,B) is divided by planes extending radially from an achromatic color axis (R=G=B). The hue determining circuit 422 decides where an input image signal (R,G,B) exists among the divided spaces. After that, color calibration processing is performed by using the following equation by using a masking coefficient which have been set for each space, in which, as is indicated in the equation (1), the masking coefficient can be represented as a matrix. At the time, linear processing and the like is performed as necessary. Hereinafter, a divided point is used meaning a point at which a boundary plane and an edge are intersected like a point A in FIG. 5A.

$$\begin{pmatrix} C \\ M \\ Y \\ K \end{pmatrix} = \begin{pmatrix} a_{cr} & a_{cg} & a_{cb} & a_c \\ a_{mr} & a_{mg} & a_{mb} & a_m \\ a_{yr} & a_{yg} & a_{yb} & a_y \\ a_{kr} & a_{kg} & a_{kb} & a_k \end{pmatrix} \times \begin{pmatrix} R \\ G \\ B \\ 1 \end{pmatrix} \quad (1)$$

Normally, the masking coefficient in each space is calculated by using a following equation after determining values of R,G,B of four points which are different two points (R1,G1,B1) and (R2,G2,B2) on the achromatic color axis and two points (R3,G3,B3) and (R4,G4,B4) on two boundary planes which are not on the achromatic color axis, and recording values (C1,M1,Y1,K1), (C2,M2,Y2,K2), (C3,M3, Y3,K3) and (C4,M4,Y4,K4) of developing parts C, M, Y and K optimal for reproducing colors for the four points.

$$\begin{pmatrix} a_{cr} & a_{cg} & a_{cb} & a_c \\ a_{mr} & a_{mg} & a_{mb} & a_m \\ a_{yr} & a_{yg} & a_{yb} & a_y \\ a_{kr} & a_{kg} & a_{kb} & a_k \end{pmatrix} = \begin{pmatrix} C1 & C2 & C3 & C4 \\ M1 & M2 & M3 & M4 \\ Y1 & Y2 & Y3 & Y4 \\ K1 & K2 & K3 & K4 \end{pmatrix} \times \begin{pmatrix} R1 & R2 & R3 & R4 \\ G1 & G2 & G3 & G4 \\ B1 & B2 & B3 & B4 \\ 1 & 1 & 1 & 1 \end{pmatrix}^{-1} \quad (2)$$

Here, the recording values of C, M, Y and K for each point are equivalent achromatic color density conversion values before performing UCR (under color removing). For the sake of simplicity, two points on the achromatic color axis are a white point and a black point in the following description. In this case, when it is assumed that the maximum value which the equivalent achromatic color density conversion value can take is Xmax, there are following relationships between each value.

In the case of the white point $$R1=G1=B1=C1=M1=Y1=0 \geq K1.$$

In the case of black point:

$$R1=G1=B1=C1=M1=Y1=X\max \geq K2.$$

In addition, it is favorable to adopt a point in which the minimum value of the recording value of developing parts C, M, Y and K is 0 and the maximum value of the recording value is Xmax for the two points on the boundary planes, that is, a point which has the highest saturation which can be recorded on each boundary plane. That is, following equations are satisfied.

$$\mathrm{Min}(C3,M3,Y3)=0 \geq K3$$

$$\mathrm{Max}(C3,M3,Y3)=X\max$$

$$\mathrm{Min}(C4,M4,Y4)=0 \geq K4$$

$$\mathrm{Max}(C4,M4,Y4)=X\max$$

The UCR rate can be controlled by determining the recording value of the developing part K in the following way from the minimum value in the developing parts C, M and Y.

When UCR rate is 100%: K=Min(C,M,Y)

When UCR rate is 70%: K=Min(C,M,Y)×0.7

When the color space (R,G,B) is divided by using six boundary planes as shown in FIG. 5A, R, G, B values of at least eight points which are six points on each boundary plane and two points on the achromatic color axis, and optimal recording values of the developing parts C, M, Y and K for reproducing the colors are determined beforehand. Then, the masking coefficient for each space is obtained on the basis of these. By storing the masking coefficients of each space obtained in the above-mentioned way in a ROM, RAM and the like, color calibration can be performed by selecting a proper masking coefficient for a color determined on a hue determining process.

In the color calibration process on the present invention, the masking coefficient is corrected in order to calibrate difference of spectral characteristics between CCDs. That is, corrected masking coefficient is calculated for each color (hue). In the following, the method will be described.

It is assumed that (R3,G3,B3) are values obtained if a color of a point on a boundary plane which is not on the achromatic color axis is read by a scanner CCD having standard spectral characteristics for example. When another scanner reads the same point (color), the point is read as (R3',G3',B3') which are different from (R3,G3,B3) due to variation of spectral characteristics of the scanner CCDs. As a result, the recording values of the developing parts C, M, Y and K are calculated as (C3',M3',Y3',K3') by the equation (1). That is, the values can be represented by the following equation.

$$\begin{pmatrix} C3' \\ M3' \\ Y3' \\ K3' \end{pmatrix} = \begin{pmatrix} a_{cr} & a_{cg} & a_{cb} & a_c \\ a_{mr} & a_{mg} & a_{mb} & a_m \\ a_{yr} & a_{yg} & a_{yb} & a_y \\ a_{kr} & a_{kg} & a_{kb} & a_k \end{pmatrix} \times \begin{pmatrix} R3' \\ G3' \\ B3' \\ 1 \end{pmatrix} \quad (3)$$

However, the recording values of the developing parts C, M, Y and K optimal for reproducing the color (R3,G3,B3) should be (C3,M3,Y3,K3). Thus, the difference values shown in the equation (4) become a cause for preventing faithful color reproduction.

$$\begin{pmatrix} C_D \\ M_D \\ Y_D \\ K_D \end{pmatrix} = \begin{pmatrix} C3 \\ M3 \\ Y3 \\ K3 \end{pmatrix} - \begin{pmatrix} C3' \\ M3' \\ Y3' \\ K3' \end{pmatrix} \quad (4)$$

In this embodiment, the variation of the spectral characteristics of the scanner CCDs is calibrated by using the difference values. This process will be described in the following.

The difference values of the equation (4) are added to each element in the first term in the right side of an equation (2) which is used for calculating the masking coefficient as shown in the following equation.

$$\begin{pmatrix} C \\ M \\ Y \\ K \end{pmatrix} = \begin{pmatrix} C1+C_D & C2+C_D & C3+C_D & C4+C_D \\ M1+M_D & M2+M_D & M3+M_D & M4+M_D \\ Y1+Y_D & Y2+Y_D & Y3+Y_D & Y4+Y_D \\ K1+K_D & K2+K_D & K3'+K_D & K4+K_D \end{pmatrix} \times \begin{pmatrix} R1 & R2 & R3 & R4 \\ G1 & G2 & G3 & G4 \\ B1 & B2 & B3 & B4 \\ 1 & 1 & 1 & 1 \end{pmatrix}^{-1} \begin{pmatrix} R3' \\ G3' \\ B3' \\ 1 \end{pmatrix} \quad (5)$$

Assuming $\begin{pmatrix} R'' \\ G'' \\ B'' \\ T \end{pmatrix} = \begin{pmatrix} R1 & R2 & R3 & R4 \\ G1 & G2 & G3 & G4 \\ B1 & B2 & B3 & B4 \\ 1 & 1 & 1 & 1 \end{pmatrix}^{-1} \begin{pmatrix} R3' \\ G3' \\ B3' \\ 1 \end{pmatrix}$, the (6)

the following equation (7) holds true.

$$\begin{pmatrix} R1 & R2 & R3 & R4 \\ G1 & G2 & G3 & G4 \\ B1 & B2 & B3 & B4 \\ 1 & 1 & 1 & 1 \end{pmatrix} \begin{pmatrix} R'' \\ G'' \\ B'' \\ T \end{pmatrix} = \begin{pmatrix} R3' \\ G3' \\ B3' \\ 1 \end{pmatrix} \quad (7)$$

Therefore, R"+G"+B"+T=1 is obtained by comparing fourth row in the vectors. By substituting the equation (6) into the equation (5), a following equation (8) is obtained.

$$\begin{pmatrix} C \\ M \\ Y \\ K \end{pmatrix} = \begin{pmatrix} C1+C_D & C2+C_D & C3+C_D & C4+C_D \\ M1+M_D & M2+M_D & M3+M_D & M4+M_D \\ Y1+Y_D & Y2+Y_D & Y3+Y_D & Y4+Y_D \\ K1+K_D & K2+K_D & K3'+K_D & K4+K_D \end{pmatrix} \times \begin{pmatrix} R'' \\ G'' \\ B'' \\ T \end{pmatrix} = \quad (8)$$

-continued $$\begin{pmatrix} (C1R'' + C2G'' + C3B'' + C4T) + C_D(R'' + G'' + B'' + T) \\ \ldots \\ \ldots \\ \ldots \end{pmatrix}$$

The first term in the first element in the vector is the same as C3' of the equation (3) according to the definition of the equations (1), (2) and (6). Since R"+G"+B"+T=1, the equation (8) becomes $$= \begin{pmatrix} C3' + D_D \\ M3' + M_D \\ Y3' + Y_D \\ K3' + K_D \end{pmatrix} \text{ by equation (4)} = \begin{pmatrix} C3 \\ M3 \\ Y3 \\ K3 \end{pmatrix}. \quad (9)$$

That is, the values (C3,M3,Y3,K3) which should be obtained can be obtained by using the difference values of the equation (4).

As mentioned above, the corrected masking coefficient is calculated and the recording values of the developing parts C, M, Y and K of the point on the boundary plane are corrected by using the masking coefficient, so that color calibration in the space within the boundary planes can be performed by performing linear calculation and the like.

The difference values between the recording values of the developing parts C, M, Y and K optimal for reproducing a color (R,G,B) read by a scanner CCD having standard spectral characteristics and C', M', Y' and K' calculated by multiplying read values (R',G',B') of a scanner CCD having spectral characteristics variation by the uncorrected masking coefficient are calculated. Then, the masking coefficient is corrected by performing calculation of an equation (10) by using the difference values.

$$\begin{pmatrix} C_1+C_D & C_2+C_D & C_3+C_D & C_4+C_D \\ M_1+M_D & M_2+M_D & M_3+M_D & M_4+M_D \\ Y_1+Y_D & Y_2+Y_D & Y_3+Y_D & Y_4+Y_D \\ K_1+K_D & K_2+K_D & K_3+K_D & K_4+K_D \end{pmatrix} \times \quad (10)$$

$$\begin{pmatrix} R1 & R2 & R3 & R4 \\ G1 & G2 & G3 & G4 \\ B1 & B2 & B3 & B4 \\ 1 & 1 & 1 & 1 \end{pmatrix}^{-1}$$

Accordingly, the variation of the spectral characteristics is calibrated and faithful color reproduction can be realized.

Figure 6:
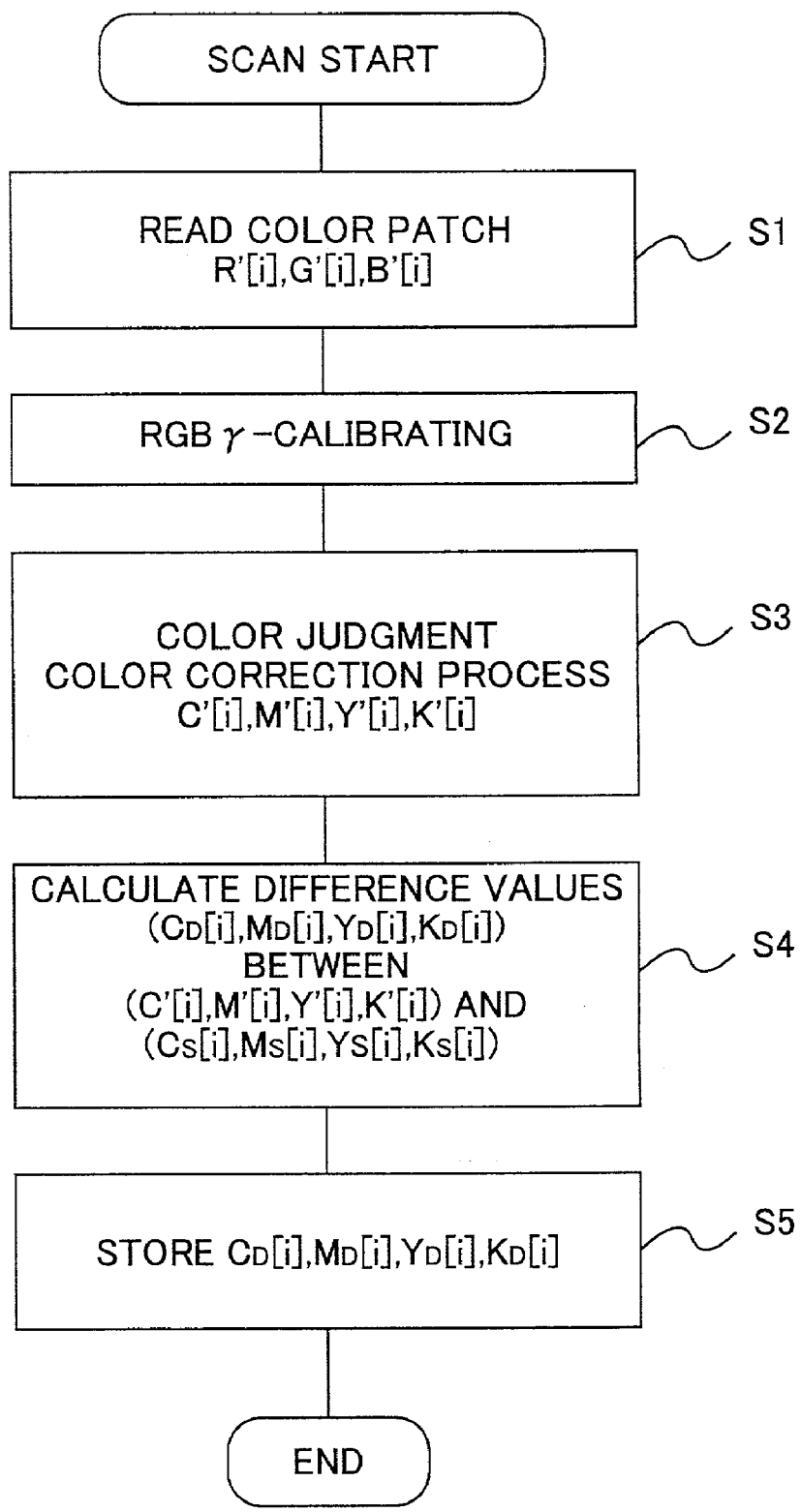
FIG. 6 is a flowchart indicating a procedure for obtaining difference values.

In the following, a procedure for obtaining the difference values in the color calibration processing using the above-mentioned method will be described concretely with reference to a flowchart of FIG. 6.

Figure 7:
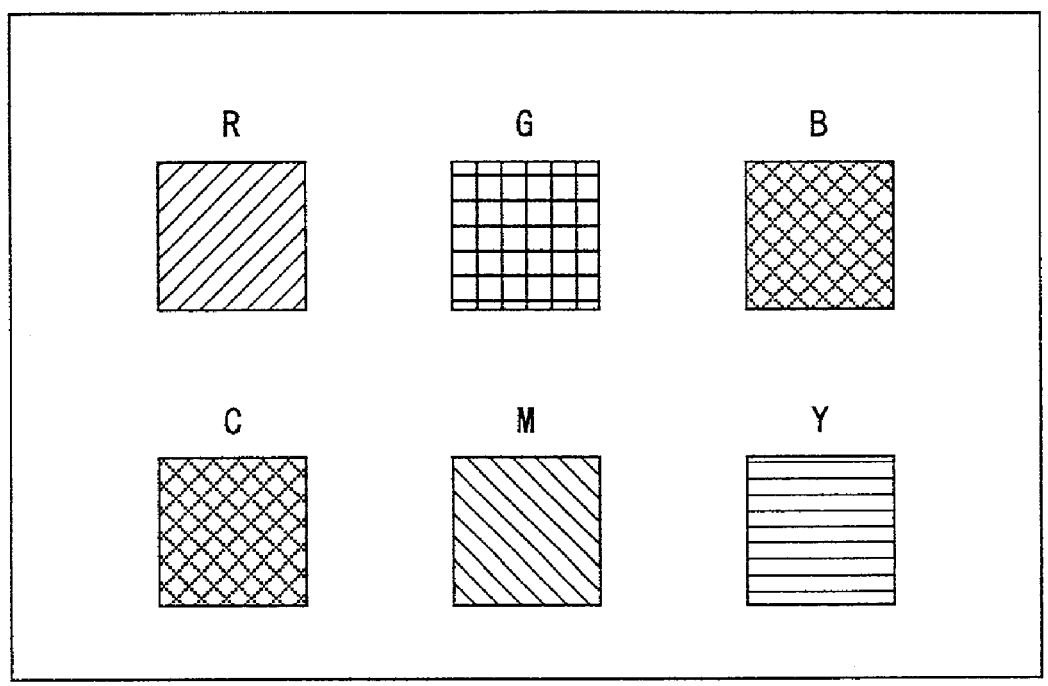
FIG. 7 shows examples of color patches.

In this example, the color space is divided by points of red (R), yellow (Y), green (G), cyan (C), blue (B), magenta (M) for example. A patch chart having red, yellow, green, cyan, blue and magenta of which the spectral characteristics are known as shown in FIG. 7 is used. By using a document having colors near the boundary points by which the hue (color space) is divided, reproducibility of colors of the boundary points can become faithful.

In addition, read values (Rs[i],Gs[i],Bs[i]:i=R,G,B,C,M, Y) obtained if the chart shown in FIG. 7 is read by a scanner CCD having standard spectral characteristics, and recording values (Cs[i],Ms[i],Ys[i],Ks[i]:i=R,G,B,C,M,Y) of the developing parts C, M, Y and K calculated from (Rs[i],Gs [i],Bs[i]:i=R,G,B,C,M,Y) are calculated beforehand, and the values will be used in the following process. These values can be stored in a ROM or a RAM beforehand.

First, the chart of FIG. 7 is read by the scanner, so that reading values of each patch (R'[i],G'[i],B'[i]) are obtained in step 1. Next, RGB γ correction is performed on the read values (R'[i],G'[i],B'[i]) in step 2. Then, the hue determining circuit determines color of each patch, and a masking coefficient corresponding to the color of each patch, and (C'[i],M'[i],Y'[i],K'[i]) is calculated by using the equation (3) in step 3.

Then, difference values ($C_D$[i], [i],$M_D$[i],$Y_D$[i],$K_D$[i]) between the obtained values (C'[i],M'[i],Y'[i],K'[i]) and (Cs [i],Ms[i],Ys[i],Ks[i]) which have been calculated are calculated in step 4. The difference values ($C_D$[i],$M_D$[i],$Y_D$[i], $K_D$[i]) are stored as correction values in step 5. The above process is performed for each color.

By storing read values (Rs[i],Gs[i],Bs[i]) by a scanner CCD having standard spectral characteristics, and recording values (Cs[i],Ms[i],Ys[i],Ks[i]) of the developing parts C, M, Y and K calculated from (Rs[i],Gs[i],Bs[i]) in the ROM 416 or in a RAM 417 in the image forming apparatus, the process for calculating the difference values can be performed by using the RGBγ correction circuit 403 and the color calibration processing circuit 406.

Next, a process for calculating the corrected masking coefficient will be described concretely.

As described before, the masking coefficient is calculated from (R,G,B) values of the white point, the black point and two points on the boundary plane which are not on the achromatic color axis, and (C,M,Y,K) values of the developing parts optimal for reproducing the colors. As mentioned above, in this embodiment, the color space (R,G,B) is divided into six spaces of R, Y, G, C, B, M, and each value of the divided point is represented as (R[i],G[i],B[i]:i=R,Y, G,C,B,M). In addition, (R[i],G[i],B[i]:i=R,Y,G,C,B,M) is called as a scanner vector. The recording values of the developing parts C, M, Y and K optimal for reproducing color of each divided point are represented as (C[i],M[i],Y [i],K[i]:i=R,Y,G,C,B,M), and (C[i],M[i],Y[i],K[i]:i=R,Y,G, C,B,M) is called a printer vector in the following description. For the white and black points, these are represented as (R[j],G[j],B[j]:i=W,K) and (C[j],M[j],Y[j],K[j]:j=W,K). The scanner vector and the printer vector are stored in the ROM 416 or in the RAM 417 beforehand.

For example, if the R patch read when calculating the correction value is in a M-R space, the corrected masking coefficient can be calculated by adding the correction values ($C_D$[R],$M_D$[R],$Y_D$[R],$K_D$[R]) to all printer vectors which form the masking coefficient of the M-R space from the equation (10). That is, the corrected masking coefficients can be represented as the equation (11).

By storing thus obtained masking coefficients in the ROM or in the RAM, a proper masking coefficient can be selected and used according to the result of hue determination of the input image.

Figure 8:
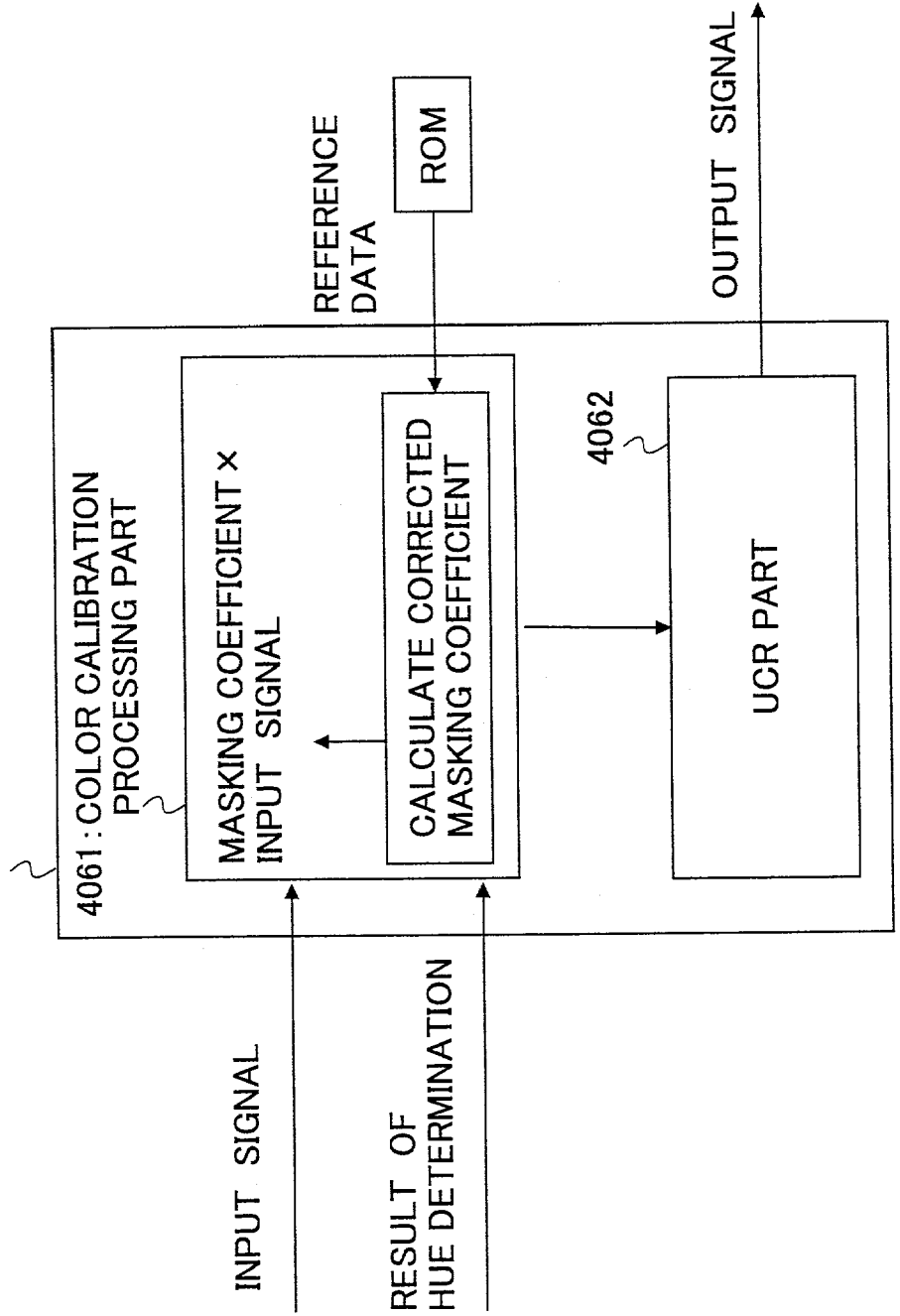
FIG. 8 shows a block diagram of the color calibration processing circuit.

The above process will be described by using a process block diagram of the color calibration processing circuit 406 shown in FIG. 8. As shown in FIG. 8, an input signal obtained by reading the color patch and the result of the hue determination are input into a color calibration processing part 4061. Next, a reference masking coefficient and CMYK values are read from the ROM and the like, and the difference values are calculated. Then, the masking coefficient is calculated by using the equation (11), and the masking coefficient is stored. In a normal image processing, the color calibration process is performed by using the masking coefficient, and under-color-removing-process is performed in the UCR part 4062.

Normally, the processes of steps 1–5 and calculation of masking coefficients are performed in a manufacturing process. However, a serviceman or a user, for example, can calculate the difference values and the masking coefficient, so that calibration of CCD for variation over time can be performed. In addition, by providing a color patch in the copying machine, operability at the time of calibration can be improved.

In addition, the image forming apparatus can be configured such that the color patch is read on a regular basis or when change over time of CCD is detected, and the correction values and the masking coefficient are automatically calculated.

In addition, the image forming apparatus can be configured such that the read values by the scanner CCD are captured from an external image processing apparatus by the I/F 413, and after the correction values are calculated, the calculated correction values ($C_D$[i],$M_D$[i],$Y_D$[i],$K_D$[i]) are stored in the ROM 416 or in the RAM 417 in the image forming apparatus, and the calculation of the masking coefficient is performed in the image forming apparatus. In addition, the external image processing apparatus may calculate the masking coefficient, and the masking coefficient may be stored in the ROM 416 or in the RAM 417 in the image forming apparatus. In addition, by installing a program for calculating the correction values and the masking coefficient in a computer, the computer can calculate the correction values and the masking coefficients by inputting values read by the scanner CCD.

Second Embodiment

In the first embodiment, the difference value is added to every printer vectors when calculating the corrected masking coefficient as shown in equation (11). As indicated by the equations 8 and 9, color calibration can be performed effectively by this method.

However, since the printer vectors of the white and black points are used for calculation of masking coefficients for every divided color space, when different correction values $$\begin{pmatrix} a_{cr} & a_{cg} & a_{cb} & a_c \\ a_{mr} & a_{mg} & a_{mb} & a_m \\ a_{yr} & a_{yg} & a_{yb} & a_y \\ a_{kr} & a_{kg} & a_{kb} & a_k \end{pmatrix} = \begin{pmatrix} C[W]+C_D[R] & C[K]+C_D[R] & C[M]+C_D[R] & C[R]+C_D[R] \\ M[W]+M_D[R] & M[K]+M_D[R] & M[M]+M_D[R] & M[R]+M_D[R] \\ Y[W]+Y_D[R] & Y[K]+Y_D[R] & Y[M]+Y_D[R] & Y[R]+Y_D[R] \\ K[W]+K_D[R] & K[K]+K_D[R] & K[M]+K_D[R] & K[R]+K_D[R] \end{pmatrix} \times \begin{pmatrix} R[W] & R[K] & R[M] & R[R] \\ G[W] & G[K] & G[M] & G[R] \\ B[W] & B[K] & B[M] & B[R] \\ 1 & 1 & 1 & 1 \end{pmatrix}^{-1} \quad (11)$$

are used for each space, there is a case that discontiguous spaces are generated around the boundary planes near the white and black points.

In addition, for a printer vector of another point of the boundary point, by using difference values corresponding to the point, discontinuity on each boundary plane can be prevented.

In the second embodiment, in consideration of these points, in the above example using R patch, the correction values ($C_D[R], M_D[R], Y_D[R], K_D[R]$) and ($C_D[M], M_D[M], Y_D[M], K_D[M]$) corresponding to printer vectors of R and M respectively stored in the ROM 416 or in the RAM 417 are added to corresponding printer vectors respectively, and the masking coefficient is calculated by the color calibration processing circuit 406. That is, calculation shown in a following equation (12) is performed.

$$\begin{pmatrix} a_{cr} & a_{cg} & a_{cb} & a_c \\ a_{mr} & a_{mg} & a_{mb} & a_m \\ a_{yr} & a_{yg} & a_{yb} & a_y \\ a_{kr} & a_{kg} & a_{kb} & a_k \end{pmatrix} = \quad (12)$$

$$\begin{pmatrix} C[W] & C[K] & C[M]+C_D[M] & C[R]+C_D[R] \\ M[W] & M[K] & M[M]+M_D[M] & M[R]+M_D[R] \\ Y[W] & Y[K] & Y[M]+Y_D[M] & Y[R]+Y_D[R] \\ K[W] & K[K] & K[M]+K_D[M] & K[R]+K_D[R] \end{pmatrix} \times$$

$$\begin{pmatrix} R[W] & R[K] & R[M] & R[R] \\ G[W] & G[K] & G[M] & G[R] \\ B[W] & B[K] & B[M] & B[R] \\ 1 & 1 & 1 & 1 \end{pmatrix}^{-1}$$

In an actual image forming process, calculation of the equation (1) is performed on image information read by the scanner by using the color calibration processing circuit 406 by using the masking coefficient calculated by using the equation (12), so that the variation of spectral characteristics of the scanner CCD is calibrated, and continuous and faithful color reproduction can be performed.

Third Embodiment

In the first and second embodiments, the masking coefficient is calculated by using the difference values indicated by the equation (4). In the third embodiment, a method for calculating the masking coefficient without using the difference values.

In a case where the color space is divided by points red (R), yellow (Y), green (G), cyan (C), blue (B), magenta (M) in the same way as the above mentioned embodiments, the masking coefficient (before correction) of the hue between R and Y can be represented by an equation (13).

$$\begin{pmatrix} a_{cr} & a_{cg} & a_{cb} & a_c \\ a_{mr} & a_{mg} & a_{mb} & a_m \\ a_{yr} & a_{yg} & a_{yb} & a_y \\ a_{kr} & a_{kg} & a_{kb} & a_k \end{pmatrix} = \quad (13)$$

-continued $$\begin{pmatrix} C[R] & C[Y] & C[W] & C[K] \\ M[R] & M[Y] & M[W] & M[K] \\ Y[R] & Y[Y] & Y[W] & Y[K] \\ K[R] & K[Y] & K[W] & K[K] \end{pmatrix} \times \begin{pmatrix} R[R] & R[Y] & R[W] & R[K] \\ G[R] & G[Y] & G[W] & G[K] \\ B[R] & B[Y] & B[W] & B[K] \\ 1 & 1 & 1 & 1 \end{pmatrix}^{-1}$$

For example, assuming that values obtained by reading the R patch by a scanner CCD having variation of spectral characteristics is (R'[R],G'[R],B'[R]), values calculated by the masking coefficient of the equation (13) can be represented by a following equation.

$$\begin{pmatrix} C'[R] \\ M'[R] \\ Y'[R] \\ K'[R] \end{pmatrix} = \begin{pmatrix} C[R] & C[Y] & C[W] & C[K] \\ M[R] & M[Y] & M[W] & M[K] \\ Y[R] & Y[Y] & Y[W] & Y[K] \\ K[R] & K[Y] & K[W] & K[K] \end{pmatrix} \times \quad (14)$$

$$\begin{pmatrix} R[R] & R[Y] & R[W] & R[K] \\ G[R] & G[Y] & G[W] & G[K] \\ B[R] & B[Y] & B[W] & B[K] \\ 1 & 1 & 1 & 1 \end{pmatrix}^{-1} \times \begin{pmatrix} R'[R] \\ G'[R] \\ B'[R] \\ 1 \end{pmatrix}$$

Therefore, (C[R],M[R],Y[R],K[R]) optimal for color reproducing of the R patch can not be obtained.

To solve this problem, variation of spectral characteristics of the scanner CCD is calibrated by using machine-specific scanner vectors as the scanner vector part of the equation (13). That is, the RGB values (R'[i],G'[i],B'[i]:i=R,Y,G,C,B,M) obtained by reading the color patch of FIG. 7 are used as the scanner vector. Therefore, $$\begin{pmatrix} C[R] \\ M[R] \\ Y[R] \\ K[R] \end{pmatrix} = \begin{pmatrix} C[R] & C[Y] & C[W] & C[K] \\ M[R] & M[Y] & M[W] & M[K] \\ Y[R] & Y[Y] & Y[W] & Y[K] \\ K[R] & K[Y] & K[W] & K[K] \end{pmatrix} \times \quad (15)$$

$$\begin{pmatrix} R'[R] & R'[Y] & R[W] & R[K] \\ G'[R] & G'[Y] & G[W] & G[K] \\ B'[R] & B'[Y] & B[W] & B[K] \\ 1 & 1 & 1 & 1 \end{pmatrix}^{-1} \times \begin{pmatrix} R'[R] \\ G'[R] \\ B'[R] \\ 1 \end{pmatrix}$$

holds true, so that (C[R],M[R],Y[R],K[R]) optimal for reproducing colors of the R patch of FIG. 7 can be obtained. Accordingly, the masking coefficient is calculated by using scanner reading values (scanner vectors) of the divided points by which the hue is divided and recording values (printer vectors) of the developing parts C, M, Y and K optimal for reproducing color of the divided points. Then, faithful color reproduction can be performed by calibrating variation of spectral characteristics of the scanner CCD by using the masking coefficient.

According to then third embodiment, different from the first and second embodiments, it becomes unnecessary to hold the difference values ($C_D[i], M_D[i], Y_D[i], K_D[i]$), and, faithful color reproduction can be performed.

In addition, it is possible that the hue determining circuit determines the hue of the color of the patch and optimal CMYK output image signals according to the determined hue are read from a memory and the like, and the read values can be used for calculating the masking coefficient of the third embodiment.

(Fourth Embodiment)

The above mentioned color calibration process can be applied not only to the copying machine shown in FIG. 2 but also to other image forming apparatuses. In the following, an example using a printer 500 as an image forming apparatus other than the copying machine will be described as the fourth embodiment.

Figure 9:
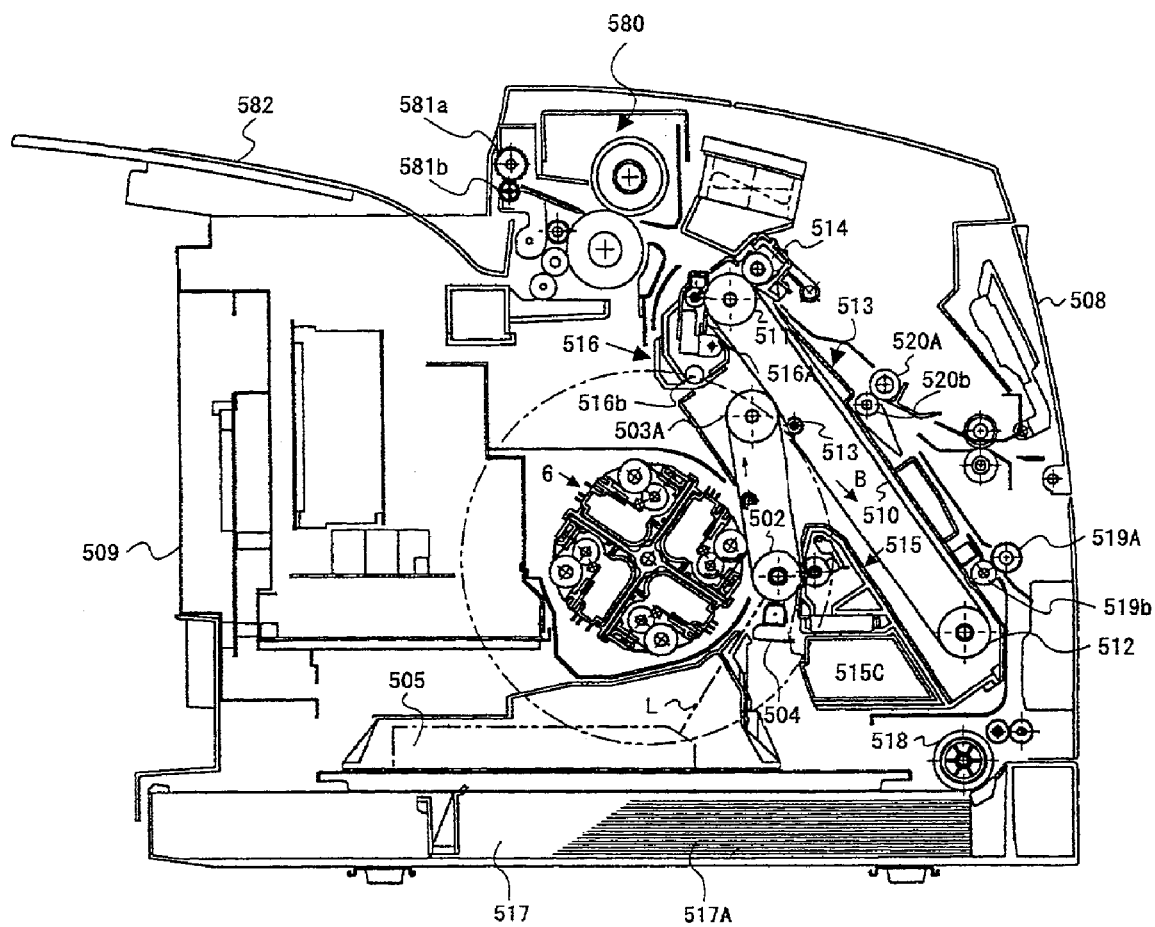
FIG. 9 shows a block diagram of the printer 500 according to a fourth embodiment of the present invention.

FIG. 9 shows a block diagram of the printer 500 according to the fourth embodiment of the present invention. In FIG. 9, designated at the reference numeral 501 is a belt-like flexible photosensitive part which is a belt-like image carrier. The photosensitive belt 501 is provided between rotating rollers 502 and 503, and is moved in the direction indicated by an arrow A (clockwise direction) in the figure by rotation of the rotating roller 502. In the figure, designated at the reference numeral 504 is an electrification charger which is an electrification means for electrifying the surface of the photosensitive belt 501 uniformly, at the reference numeral 505 is a laser writing system unit which is an electrostatic image exposure means, at the reference numeral 506 is a color developing apparatus in which four developing devices having after-mentioned toners of yellow, magenta, cyan and black are integrated.

In the figure, designated at the reference numeral 510 is an intermediate transfer belt 510. The intermediate transfer belt 510 is provided between the rotating rollers 511 and 512, and moved in the direction indicated by an arrow B (counterclockwise direction) by rotation of the rotating roller 511. The photosensitive belt 501 touches the intermediate transfer belt 510 at the rotating roller 503. In the intermediate transfer belt 510 side of the touching part, a bias roller 513 having conductivity touches the back surface of the intermediate transfer belt 510 in a predetermined condition. In the following, the image forming operation of the printer will be described. In FIG. 9, after the belt-like photosensitive part (latent image carrier) 501 is electrified uniformly by the electrification charger 504, the laser optical device 505 performs scanning and exposure on the basis of image information, so that electrostatic latent image is formed on the surface of the belt-like photosensitive part (latent image carrier) 501. The image information which is exposed is resolved colors each being single color image information of yellow, cyan, magenta and black into which a desired full-color image is resolved. According to this information, the laser beam L generated by the semiconductor laser (which is not shown in the figure) is used for scanning by the optical device not shown in the figure and the path of the laser beam is adjusted.

The electrostatic latent image formed here is developed as each single color by the predetermined yellow, cyan, magenta and black toner by the after-mentioned rotation type developing apparatus 506, and the image of each color is formed on the photosensitive belt successively.

Each single color image formed on the photosensitive belt 501 which rotates in the direction of the arrow A in the figure is transferred and overlaid successively to the intermediate transfer belt 510 which rotates in the direction of the arrow B for each single color of yellow, cyan, magenta and black. The images of yellow, cyan, magenta and black overlaid on the intermediate transfer belt 510 are transferred on the transfer paper 517a conveyed to the transferring part via the feeding roller 518, pair of carrying rollers 519a and 519b and pair of resist rollers 520a and 520b from the sheet feeder 517. After the transfer ends, the transfer paper 517a is fixed by a fixing device 580, so that the full-color image is completed, and the print image is ejected to the ejection stack part 582 via the pair of ejection rollers 581a and 581b.

The color calibration process of the present invention is performed in the laser writing system unit 505 which resolves the desired full-color image into color information of yellow, cyan, magenta and black and performs exposure or in the control apparatus (not shown in the figure). That is, input image information is converted by the masking coefficient and exposure is performed on the basis of color information of yellow, cyan, magenta and black obtained by the conversion.

Figure 10:
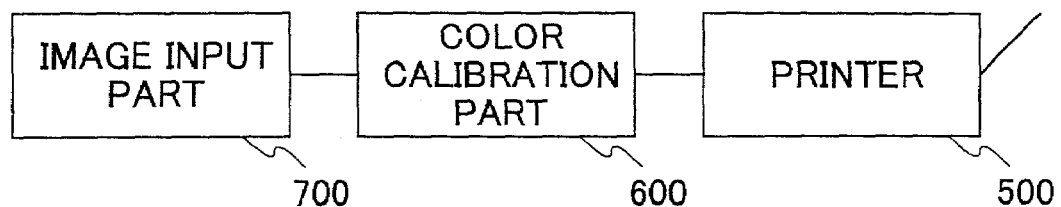
FIG. 10 shows a configuration when a color calibration part 600 is in the outside of the printer.

The control apparatus may be provided in the inside of the printer or the outside of the printer. When providing the control apparatus (color calibration part) in the outside, the configuration can be as shown in FIG. 10 for example. In FIG. 10, the image input part 700 is a scanner and the like. However, any apparatus (camera for example) can be used as long as the apparatus outputs an image as R, G, B data. In addition, the image input part 700 may be an apparatus which does not receive an image, instead, stores image data obtained by other apparatus and the like. The color calibrating part 600 performs the process for calculating CMYK necessary for color reproduction by using the masking coefficient described on the embodiments 1–3, the UCR process and other necessary processes. The correction of the masking coefficient can be performed by reading reference colors (color patch and the like) from the image input part 700. Accordingly, variation and time change for each device of the image input part 700 can be calibrated.

The color calibration part 600 can be configured by a general computer by using software for performing the processing of the color calibration. In addition, the color calibration part 600 can be configured by using hardware for image processing. In addition, the image input part and the color calibration part 600 can be integrated.

As mentioned above, according to the present invention, variation of spectral characteristics of the scanner CCD from device to device even for chromatic color can be calibrated. Therefore, an image forming apparatus which can reproduce color faithfully can be provided.

In addition, discontinuity of each boundary plane can be prevented, so that faithful color reproduction can be performed without loosing continuity.

In addition, the reference values can be obtained easily when the apparatus is manufactured or when a serviceman performs adjustment.

In addition, the masking coefficient can be easily obtained by storing the difference values. Further, the difference values can be used for other apparatus and the like.

By using a document having a color close to the boundary point by which the hue is divided, the color of the boundary point can be reproduced faithfully.

The present invention is not limited to the specifically disclosed embodiments, and variations and modifications may be made without departing from the scope of the invention.

What is claimed is:

1. An image forming apparatus comprising:
an image reading part, including a CCD, for optically reading a color document by scanning said color document;
an image processing part for converting, by using a masking coefficient, RGB input image signals obtained by reading said color document by said image reading part into CMYK output image signals used for recording by developing parts;

a part for calculating said masking coefficient by using RGB input image signals obtained by reading a document of which spectral characteristics are known by said image reading part and CMYK output image signals optimal for reproducing a color of said document.

2. The image forming apparatus as claimed in claim 1, further comprising:

a hue determining part for determining a hue to which said RGB input image signals obtained by reading said document belong among hues corresponding to RGB color spaces divided by planes including an achromatic color axis; and a memory part for storing CMYK output image signal values optimal for reproducing a color of said document of which spectral characteristics are known;

wherein said image reading part reads said document of which spectral characteristics are known;

said hue determining part determines a hue to which said color of said document belongs;

optimal CMYK output image signals is read from said memory part according to said hue; and said masking coefficient is calculated from said RGB input image signals obtained by reading said document and said CMYK output image signals.

3. The image forming apparatus as claimed in claim 1, further comprising a part for storing RGB input image signals obtained if said document of which spectral characteristics are known is read by an image reading device which has standard spectral characteristics, or CMYK output image signals converted from said RGB input image signals beforehand.

4. An image forming apparatus comprising:

an image reading part, including a CCD, for optically reading a color document by scanning said color document;

an image processing part for converting, by using a masking coefficient, RGB input image signals obtained by reading said color document by said image reading part into CMYK output image signals used for recording by developing parts;

a part for calculating difference values between first CMYK output image signals and second CMYK output image signals, and calculating said masking coefficient by using said difference values, wherein said first CMYK output image signals are obtained by converting, by using a predetermined masking coefficient, first RGB input image signals obtained by reading a document of which spectral characteristics are known by using said image reading part, and said second CMYK output image signals are obtained by converting, by using said predetermined masking coefficient, second RGB input image signals obtained if said document of which spectral characteristics are known is read by an image reading device which has standard spectral characteristics.

5. The image forming apparatus as claimed in claim 4, wherein said predetermined masking coefficient is calculated by using first two points of spectral data on an achromatic color axis, second two points of spectral data on two boundary planes which are boundary planes forming a color space corresponding to said spectral characteristics of said document in which said second two points are not on said achromatic color axis, and four points of CMYK output image signal data optimal for reproducing colors of four points of said first and second two points; and said predetermined masking coefficient is corrected by correcting said four points of CMYK output image signals by using said difference values.

6. The image forming apparatus as claimed in claim 4, wherein said predetermined masking coefficient is calculated by using first two points of spectral data on an achromatic color axis, second two points of spectral data on two boundary planes which are boundary planes forming a color space corresponding to said spectral characteristics of said document in which said second two points are not on said achromatic color axis, and four points of CMYK output image signal data optimal for reproducing colors of four points of said first and second two points; and said predetermined masking coefficient is corrected by correcting CMYK output image signals of said second two points on said two boundary planes by using said difference values in which CMYK output image signals of said first two points on said achromatic color axis are not corrected.

7. The image forming apparatus as claimed in claim 4, further comprising a part for storing RGB input image signals obtained if said document of which spectral characteristics are known is read by an image reading device which has standard spectral characteristics, or CMYK output image signals converted from said RGB input image signals beforehand.

8. The image forming apparatus as claimed in claim 4, further comprising a part for storing said difference values.

9. The image forming apparatus as claimed in claim 8, wherein color patches having the same spectral characteristic as those of divided points on said planes used for dividing said color space are used for said document of which spectral characteristics are known, and difference values are obtained for each divided point.

10. A method used for calculating a masking coefficient in an image forming apparatus comprising: an image reading part, including a CCD, for optically reading a color document by scanning said color document; an image processing part for converting, by using a masking coefficient, RGB input image signals obtained by reading said color document by said image reading part into CMYK output image signals used for recording by developing parts;

said method comprising the step of:

calculating said masking coefficient by using RGB input image signals obtained by reading a document of which spectral characteristics are known by said image reading part and CMYK output image signals optimal for reproducing a color of said document.

11. The method as claimed in claim 10, said image forming apparatus further comprising a hue determining part for determining a hue to which said RGB input image signals obtained by reading said document belong among hues corresponding to RGB color spaces divided by planes including an achromatic color axis; and a memory part for storing CMYK output image signal values optimal for reproducing a color of said document of which spectral characteristics are known;

wherein said image reading part reads said document of which spectral characteristics are known;

said hue determining part determines a hue to which said color of said document belongs;

optimal CMYK output image signals is read from said memory part according to said hue; and said masking coefficient is calculated from said RGB input image signals obtained by reading said document and said CMYK output image signals.

12. The method as claimed in claim 10, further comprising the step of using values which have been stored beforehand as RGB input image signals obtained if said document of which spectral characteristics are known is read by an image reading device which has standard spectral characteristics, or as CMYK output image signals converted from said RGB input image signals.

13. A method used for calculating a masking coefficient in an image forming apparatus comprising: an image reading part, including a CCD, for optically reading a color document by scanning said color document; an image processing part for converting, by using a masking coefficient, RGB input image signals obtained by reading said color document by said image reading part into CMYK output image signals used for recording by developing parts;

said method comprising the step of:

calculating difference values between first CMYK output image signals and second CMYK output image signals, and calculating said masking coefficient by using said difference values, wherein said first CMYK output image signals are obtained by converting, by using a predetermined masking coefficient, first RGB input image signals obtained by reading a document of which spectral characteristics are known by using said image reading part, and said second CMYK output image signals are obtained by converting, by using said predetermined masking coefficient, second RGB input image signals obtained if said document of which spectral characteristics are known is read by an image reading device which has standard spectral characteristics.

14. The method as claimed in claim 13, wherein said predetermined masking coefficient is calculated by using first two points of spectral data on an achromatic color axis, second two points of spectral data on two boundary planes which are boundary planes forming a color space corresponding to said spectral characteristics of said document in which said second two points are not on said achromatic color axis, and four points of CMYK output image signal data optimal for reproducing colors of four points of said first and second two points; and said predetermined masking coefficient is corrected by correcting said four points of CMYK output image signals by using said difference values.

15. The method as claimed in claim 13, wherein said predetermined masking coefficient is calculated by using first two points of spectral data on an achromatic color axis, second two points of spectral data on two boundary planes which are boundary planes forming a color space corresponding to said spectral characteristics of said document in which said second two points are not on said achromatic color axis, and four points of CMYK output image signal data optimal for reproducing colors of four points of said first and second two points; and said predetermined masking coefficient is corrected by correcting CMYK output image signals of said second two points on said two boundary planes by using said difference values in which CMYK output image signals of said first two points on said achromatic color axis are not corrected.

16. The method as claimed in claim 13, further comprising the step of using values which have been stored beforehand as RGB input image signals obtained if said document of which spectral characteristics are known is read by an image reading device which has standard spectral characteristics, or as CMYK output image signals converted from said RGB input image signals.

17. The method as claimed in claim 13, further comprising the step of using values which have been stored beforehand as said difference values.

18. The method as claimed in claim 17, wherein color patches having the same spectral characteristic as those of divided points on said planes used for dividing said color space are used for said document of which spectral characteristics are known, and difference values are obtained for each divided point.

19. A computer readable medium storing program code for causing a computer to calculate a masking coefficient used in an image forming apparatus comprising: an image reading part, including a CCD, for optically reading a color document by scanning said color document; an image processing part for converting, by using a masking coefficient, RGB input image signals obtained by reading said color document by said image reading part into CMYK output image signals used for recording by developing parts;

said computer readable medium comprising:

program code means for calculating said masking coefficient by using RGB input image signals obtained by reading a document of which spectral characteristics are known by said image reading part and CMYK output image signals optimal for reproducing a color of said document.

20. A computer readable medium storing program code for causing a computer to calculate a masking coefficient used in an image forming apparatus comprising: an image reading part, including a CCD, for optically reading a color document by scanning said color document; an image processing part for converting, by using a masking coefficient, RGB input image signals obtained by reading said color document by said image reading part into CMYK output image signals used for recording by developing parts;

said computer readable medium comprising:

program code means for calculating difference values between first CMYK output image signals and second CMYK output image signals, and calculating said masking coefficient by using said difference values, wherein said first CMYK output image signals are obtained by converting, by using a predetermined masking coefficient, first RGB input image signals obtained by reading a document of which spectral characteristics are known by using said image reading part, and said second CMYK output image signals are obtained by converting, by using said predetermined masking coefficient, second RGB input image signals obtained if said document of which spectral characteristics are known is read by an image reading device which has standard spectral characteristics.

* * * * *